US010343059B2

(12) United States Patent
Rogoza et al.

(10) Patent No.: US 10,343,059 B2
(45) Date of Patent: Jul. 9, 2019

(54) HANDHELD CONTROLLER WITH THUMBSTICK GUARD

(71) Applicant: Oculus VR, LLC, Menlo Park, CA (US)

(72) Inventors: Benjamin Elliot Tunberg Rogoza, Seattle, WA (US); Sharvil Shailesh Talati, Seattle, WA (US); Yi-yaun Chen, Seattle, WA (US); Jason Andrew Higgins, Seattle, WA (US); Peter Wesley Bristol, Seattle, WA (US); Mark Shintaro Ando, Seattle, WA (US); Blake Francis Andersen, Snoqualmie, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 389 days.

(21) Appl. No.: 15/173,474

(22) Filed: Jun. 3, 2016

(65) Prior Publication Data
US 2017/0189802 A1 Jul. 6, 2017

Related U.S. Application Data

(60) Provisional application No. 62/273,427, filed on Dec. 30, 2015.

(51) Int. Cl.
*A63F 13/245* (2014.01)
*A63F 13/24* (2014.01)

(52) U.S. Cl.
CPC ............ *A63F 13/245* (2014.09); *A63F 13/24* (2014.09)

(58) Field of Classification Search
CPC ................................ A63F 13/245; A63F 13/24

USPC .......................................................... 463/38
See application file for complete search history.

(56) References Cited

U.S. PATENT DOCUMENTS

| 4,518,164 | A | 5/1985 | Hayford, Jr. et al. |
|---|---|---|---|
| 4,552,360 | A | 11/1985 | Schenck et al. |
| 5,087,825 | A | 2/1992 | Ingraham et al. |
| 5,181,009 | A | 1/1993 | Perona |
| 5,207,426 | A | 5/1993 | Inoue et al. |
| D341,094 | S | 11/1993 | Austin |
| 5,265,009 | A | 11/1993 | Colavita et al. |
| D350,351 | S | 9/1994 | Nakamura |
| 5,421,590 | A | 6/1995 | Robbins et al. |
| D363,320 | S | 10/1995 | Barthelemy et al. |
| 5,479,163 | A | 12/1995 | Samulewicz |

(Continued)

OTHER PUBLICATIONS

"STEM System" accessed and printed from URL <http://sixense.com/wireless>, 5 pages.

(Continued)

*Primary Examiner* — Omkar A Deodhar
*Assistant Examiner* — Wei Lee
(74) *Attorney, Agent, or Firm* — FisherBroyles, LLP (57) ABSTRACT

Handheld controllers having flexible thumbstick guards are disclosed herein for use with a handheld controller having a thumbstick or other pivotal control member. A representative guard has a tubular neck that sealably connects to a shaft portion of the thumbstick, and a skirt that sealably connects to an interior portion of the handheld controller around the control opening. The guard has a flexible joint portion interconnecting the neck and the skirt to allow the neck to move relative to the skirt upon pivoting the control member relative to the body.

20 Claims, 5 Drawing Sheets

(56) References Cited

U.S. PATENT DOCUMENTS

| | | |
|---|---|---|
| D369,754 S | 5/1996 | Donaldson |
| 5,551,701 A | 9/1996 | Bouton et al. |
| 5,616,078 A | 4/1997 | Oh et al. |
| 5,645,277 A | 7/1997 | Cheng |
| 5,796,354 A | 8/1998 | Cartabiano et al. |
| 5,982,355 A | 11/1999 | Jaeger et al. |
| D418,174 S | 12/1999 | Jankowski |
| D418,879 S | 1/2000 | Hornsby et al. |
| 6,173,203 B1 | 1/2001 | Barkley et al. |
| 6,192,253 B1 | 2/2001 | Charlier et al. |
| 6,430,110 B2 | 8/2002 | Baroche et al. |
| D472,972 S | 4/2003 | Anderson et al. |
| 6,544,124 B2 | 4/2003 | Woodward et al. |
| 6,572,108 B1 | 6/2003 | Bristow |
| 6,590,835 B2 | 7/2003 | Farine et al. |
| 6,652,383 B1 | 11/2003 | Sonoda et al. |
| 6,970,157 B2 | 11/2005 | Siddeeq et al. |
| 7,004,469 B2 | 2/2006 | von Goeben et al. |
| 7,106,197 B2 | 9/2006 | Gaiotto et al. |
| 7,331,793 B2 | 2/2008 | Hernandez et al. |
| 7,345,670 B2 | 3/2008 | Armstrong et al. |
| D586,823 S | 2/2009 | Anderson et al. |
| D616,417 S | 5/2010 | Liao et al. |
| 8,064,972 B2 | 11/2011 | Russo et al. |
| D656,996 S | 4/2012 | Mikhailov et al. |
| 8,188,842 B2 | 5/2012 | Otsuka et al. |
| 8,267,786 B2 | 9/2012 | Ikeda |
| 8,439,753 B2 | 5/2013 | Nagata et al. |
| 8,795,078 B1 | 8/2014 | Musick, Jr. et al. |
| 8,882,596 B2 | 11/2014 | Takahashi et al. |
| 8,994,643 B2 | 3/2015 | Goodwin et al. |
| D729,803 S | 5/2015 | Avery et al. |
| 9,141,087 B2 | 9/2015 | Brown et al. |
| 9,386,662 B1 | 7/2016 | Krueger et al. |
| 9,421,472 B2 | 8/2016 | Buller et al. |
| D772,986 S | 11/2016 | Bristol et al. |
| D780,807 S | 3/2017 | Bristol et al. |
| 9,678,566 B2 | 6/2017 | Webb et al. |
| D795,959 S | 8/2017 | Hubler et al. |
| D800,841 S | 10/2017 | Hubler et al. |
| 9,804,693 B2 | 10/2017 | Long |
| D802,055 S | 11/2017 | Chen et al. |
| 9,839,840 B2 | 12/2017 | Long et al. |
| 2001/0015718 A1 | 8/2001 | Hinckley et al. |
| 2001/0045938 A1 | 11/2001 | Willner et al. |
| 2002/0072415 A1 | 6/2002 | Kikukawa et al. |
| 2003/0100367 A1 | 5/2003 | Cooke et al. |
| 2004/0222963 A1 | 11/2004 | Guo et al. |
| 2004/0222970 A1 | 11/2004 | Martinez et al. |
| 2005/0248544 A1 | 11/2005 | Adam et al. |
| 2005/0255915 A1 | 11/2005 | Riggs et al. |
| 2006/0287089 A1 | 12/2006 | Addington et al. |
| 2007/0049374 A1 | 3/2007 | Ikeda et al. |
| 2007/0066394 A1 | 3/2007 | Ikeda et al. |
| 2007/0084293 A1 | 4/2007 | Kaiserman et al. |
| 2007/0293318 A1 | 12/2007 | Tetterington et al. |
| 2008/0261693 A1 | 10/2008 | Zalewski et al. |
| 2008/0261695 A1 | 10/2008 | Coe et al. |
| 2009/0005164 A1 | 1/2009 | Chang et al. |
| 2009/0143110 A1 | 6/2009 | Armstrong et al. |
| 2009/0149256 A1 | 6/2009 | Lui et al. |
| 2009/0239665 A1* | 9/2009 | Minuto ............... A63F 13/08 463/38 |
| 2009/0290345 A1 | 11/2009 | Shaner et al. |
| 2009/0295721 A1 | 12/2009 | Yamamoto et al. |
| 2009/0298590 A1 | 12/2009 | Marks et al. |
| 2010/0009760 A1 | 1/2010 | Shimamura et al. |
| 2010/0085321 A1 | 4/2010 | Pundsack et al. |
| 2010/0118195 A1 | 5/2010 | Eom et al. |
| 2010/0144436 A1 | 6/2010 | Marks et al. |
| 2010/0184513 A1 | 7/2010 | Mukasa et al. |
| 2011/0294579 A1 | 12/2011 | Marks et al. |
| 2012/0088582 A1 | 4/2012 | Wu et al. |
| 2012/0202597 A1 | 8/2012 | Yee et al. |
| 2012/0261551 A1 | 10/2012 | Rogers et al. |
| 2013/0162450 A1 | 6/2013 | Leong et al. |
| 2013/0324254 A1 | 12/2013 | Huang et al. |
| 2014/0015813 A1 | 1/2014 | Numaguchi et al. |
| 2014/0141891 A1 | 5/2014 | Georgy et al. |
| 2014/0203953 A1 | 7/2014 | Moser et al. |
| 2014/0228124 A1 | 8/2014 | Plagge et al. |
| 2014/0273546 A1 | 9/2014 | Harmon et al. |
| 2014/0361977 A1 | 12/2014 | Mao et al. |
| 2014/0362110 A1 | 12/2014 | Stafford |
| 2014/0364212 A1 | 12/2014 | Osman et al. |
| 2014/0378227 A1 | 12/2014 | Lee |
| 2015/0077398 A1 | 3/2015 | Yairi et al. |
| 2015/0094142 A1 | 4/2015 | Stafford |
| 2015/0155445 A1 | 6/2015 | Crowder et al. |
| 2015/0234477 A1 | 8/2015 | Watson et al. |
| 2015/0253574 A1 | 9/2015 | Thurber |
| 2015/0258431 A1 | 9/2015 | Strafford et al. |
| 2015/0258432 A1 | 9/2015 | Tokubo et al. |
| 2015/0268920 A1 | 9/2015 | Schapiro |
| 2015/0370320 A1 | 12/2015 | Connor et al. |
| 2016/0351362 A1 | 12/2016 | Gassoway et al. |
| 2016/0357249 A1 | 12/2016 | Webb et al. |
| 2016/0357261 A1 | 12/2016 | Webb et al. |
| 2016/0361637 A1 | 12/2016 | Bristol et al. |
| 2016/0361638 A1 | 12/2016 | Rogoza et al. |
| 2016/0363996 A1 | 12/2016 | Rogoza et al. |
| 2016/0364910 A1 | 12/2016 | Katz et al. |
| 2017/0128828 A1 | 5/2017 | Long |
| 2017/0131767 A1 | 5/2017 | Long |
| 2017/0136351 A1 | 5/2017 | Long |
| 2017/0139481 A1 | 5/2017 | Long et al. |
| 2017/0168303 A1 | 6/2017 | Petrov et al. |
| 2017/0177102 A1 | 6/2017 | Long et al. |
| 2017/0189798 A1 | 7/2017 | Rogoza et al. |
| 2017/0189799 A1 | 7/2017 | Anderson et al. |
| 2017/0192495 A1 | 7/2017 | Drinkwater et al. |
| 2017/0192506 A1 | 7/2017 | Andersen et al. |

OTHER PUBLICATIONS

Final Office Action dated Nov. 2, 2017 for U.S. Appl. No. 14/934,073 by Long, C., et al., filed Nov. 5, 2015.

Notice of Allowance dated Oct. 20, 2017 for U.S. Appl. No. 14/934,090 by Long, C., et al., filed Nov. 5, 2015.

Restriction Requirement dated Oct. 12, 2017 for U.S. Appl. No. 29/579,091 by Chen, Y., et al., filed Sep. 27, 2016.

Supplemental Notice of Allowability dated Sep. 29, 2017 for U.S. Appl. No. 29/571,027 by Chen, Y., et al., filed Jul. 13, 2016.

Tested, "Hands-On with Sixense STEM VR Motion-Tracking System" accessed and printed from URL <https://www.youtube.com/watch?v=C8z-On6FBTM>, 5 pages.

Non-Final Office Action dated Nov. 1, 2017 for U.S. Appl. No. 15/173,558 by Andersen, B., et al., filed Jun. 3, 2016.

Advisory Action dated Dec. 27, 2017 for U.S. Appl. No. 14/939,470 by Long, C., et al., filed Nov. 12, 2015.

Notice of Allowance dated Dec. 22, 2017 for U.S. Appl. No. 14/991,875 by Drinkwater, J., et al., filed Jan. 8, 2016.

Supplemental Notice of Allowability dated Jul. 10, 2017 of U.S. Appl. No. 29/571,030 by Chen, Y., et al., filed Jul. 13, 2016.

Supplemental Notice of Allowability dated Jul. 6, 2017 for U.S. Appl. No. 29/571,025 by Chen, Y., et al., filed Jul. 13, 2016.

Non-Final Office Action dated Jul. 17, 2017 for U.S. Appl. No. 14/939,431 by Long, C., et al., filed Nov. 12, 2015.

Final Office Action dated Aug. 18, 2017 for U.S. Appl. No. 14/939,470 by Long, C., et al., filed Nov. 12, 2015.

Non-Final Office Action dated Aug. 24, 2017 for U.S. Appl. No. 14/991,875 by Drinkwater, J., et al., filed Jan. 8, 2016.

Notice of Allowance dated Sep. 15, 2017 for U.S. Appl. No. 14/975,049 by Long, C. et al., filed Dec. 15, 2015.

U.S. Appl. No. 29/611,924 by Chen, Y., et al., filed Jul. 26, 2017.

Canadian Examiner's Report in Patent Application No. 163,150, dated Dec. 15, 2015, 5 pages.

Canadian Examiner's Report in Patent Application No. 163,150, dated Apr. 8, 2016, 7 pages.

(56) References Cited

OTHER PUBLICATIONS

Canadian Examiner's Report in Patent Application No. 167,457, dated Apr. 8, 2016, 1 page.
Canadian Examiner's Report in Patent Application No. 167,458, dated Apr. 8, 2016, 1 page.
Canadian Examiner's Report in Patent Application No. 167,456, dated Apr. 8, 2016, 1 page.
First Examination Report in Indian Patent Application No. 278272, dated Mar. 18, 2016, 2 pages.
First Examination Report in Indian Patent Application No. 278275, dated Mar. 28, 2016, 2 pages.
First Examination Report in Indian Patent Application No. 278274, dated Mar. 14, 2016, 2 pages.
First Examination Report in Indian Patent Application No. 278273, dated Mar. 18, 2016, 2 pages.
Office Action in Korean Patent Application No. 30-2015-0063452, dated Aug. 9, 2016, 3 pages.
Office Action in Mexican Design Patent Application No. MX/f/2015/003769, dated Feb. 7, 2017, 4 pages.
U.S. Appl. No. 29/529,915 by Chen, Y., et al., filed Jun. 11, 2015.
U.S. Appl. No. 29/571,025 by Chen, Y., et al., filed Jul. 13, 2016.
U.S. Appl. No. 29/571,027 by Chen, Y., et al., filed Jul. 13, 2016.
U.S. Appl. No. 29/571,030 by Chen, Y., et al., filed Jul. 13, 2016.
U.S. Appl. No. 14/991,875 by Drinkwater, J., et al., filed Jan. 8, 2016.
U.S. Appl. No. 14/939,431 by Long, C., et al., filed Nov. 12, 2015.
U.S. Appl. No. 14/934,073 by Long, C., et al., filed Nov. 5, 2015.
U.S. Appl. No. 14/939,470 by Long, C., et al., filed Nov. 12, 2015.
U.S. Appl. No. 14/975,049 by Long, C., et al., filed Dec. 18, 2015.
U.S. Appl. No. 14/934,090 by Long, C., et al., filed Nov. 5, 2015.
U.S. Appl. No. 15/172,099 by Rogoza, B., et al., filed Jun. 2, 2016.
U.S. Appl. No. 15/173,558 by Andersen, B., et al., filed Jun. 3, 2016.
U.S. Appl. No. 15/177,121 by Anderson, B., et al., filed Jun. 2, 2016.
U.S. Appl. No. 29/579,091 by Chen, Y., et al., filed Sep. 27, 2016.
Notice of Allowance dated Jun. 29, 2016, for U.S. Appl. No. 29/529,915 by Chen, Y., et al., filed Jun. 11, 2015.
Restriction Requirement dated Apr. 8, 2016, for U.S. Appl. No. 29/529,915 by Chen, Y., et al., filed Jun. 11, 2015.
Notice of Allowance dated Sep. 27, 2016, for U.S. Appl. No. 29/529,915 by Chen, Y., et al., filed Jun. 11, 2015.
Non-Final Office Action dated Mar. 23, 2017 for U.S. Appl. No. 14/934,073 by Long, C., et al., filed Nov. 5, 2015.
Non-Final Office Action dated Mar. 30, 2017 for U.S. Appl. No. 14/939,470 by Long, C., et al., filed Nov. 12, 2015.
Non-Final Office Action dated Apr. 7, 2017 for U.S. Appl. No. 14/975,049 by Long, C., et al., filed Dec. 18, 2015.
Ex Parte Quayle Action mailed May 5, 2017 for U.S. Appl. No. 29/571,027 by Chen, Y., et al., filed Jul. 13, 2016.
Ex Parte Quayle Action mailed May 5, 2017 for U.S. Appl. No. 29/571,030 by Chen, Y., et al., filed Jul. 13, 2016.
Ex Parte Quayle Action mailed May 8, 2017 for U.S. Appl. No. 29/571,025 by Chen, Y., et al., filed Jul. 13, 2016.
Notice of Allowance dated Jun. 15, 2017 of U.S. Appl. No. 29/571,030 by Chen, Y., et al., filed Jul. 13, 2016.
Notice of Allowance dated Jun. 21, 2017 for U.S. Appl. No. 29/571,025 by Chen, Y., et al., filed Jul. 13, 2016.
Notice of Allowance dated Jun. 22, 2017 for U.S. Appl. No. 29/571,027 by Chen, Y., et al., filed Jul. 13, 2016.
Office Action in Brazil Design Patent Application No. 30-2015-005620-7, dated May 30, 2017, 30 pages.

\* cited by examiner

HANDHELD CONTROLLER WITH THUMBSTICK GUARD

CROSS-REFERENCE TO RELATED APPLICATION(S)

This application claims priority to U.S. Provisional Patent Application No. 62/273,427, filed Dec. 30, 2015, entitled "Handheld Controller with Thumbstick Guard" which is incorporated in its entirety by reference thereto.

TECHNICAL FIELD

This patent application is directed to handheld controllers and, more specifically, to virtual reality handheld controllers.

BACKGROUND

In a virtual reality system, a user wears a head-mounted display that presents a selected virtual reality (VR) environment in front of the user's eyes. In some VR systems, a user can manipulate items in the virtual environment with handheld controllers that typically include a control member configured to rotate and/or pivot within an opening in the controller housing. Conventional controllers typically include a rigid dome-shaped element extending outwardly from the base of the control member to cover a portion of the opening to block dust, dirt, and other debris from passing through the opening and into an interior of the controller. However, traditional controllers utilizing these dome-shaped elements require an additional rigid, spherically-shaped element positioned within the controller housing over which the dome-shaped element can slide as the user rotates or pivots the control member. Such dome- and spherically-shaped elements are bulky and take up valuable space in the controller housing.

BRIEF DESCRIPTION OF THE DRAWINGS

Embodiments of handheld controllers having a flexible thumbstick guard introduced herein may be better understood by referring to the following Detailed Description in conjunction with the accompanying drawings, in which like reference numerals indicate identical or functionally similar elements.

The headings provided herein are for convenience only and do not necessarily affect the scope or meaning of the claimed embodiments. Further, the drawings have not necessarily been drawn to scale. For example, the dimensions of some of the elements in the figures may be expanded or reduced to help improve the understanding of the embodiments. Moreover, while the disclosed technology is amenable to various modifications and alternative forms, specific embodiments have been shown by way of example in the drawings and are described in detail below. The intention, however, is not to limit the embodiments described. On the contrary, the embodiments are intended to cover all modifications, equivalents, and alternatives falling within the scope of the embodiments as defined by the appended claims.

DETAILED DESCRIPTION

Overview

A flexible thumbstick guard for use with a handheld controller having a thumbstick or other pivotal control member is disclosed. The flexible guard has a tubular neck that sealably connects to a shaft portion of the thumbstick, and a skirt that sealably connects to an interior portion of the handheld controller around the control opening. The guard has a flexible joint portion interconnecting the neck and the skirt to allow the neck to move relative to the skirt upon pivoting the control member relative to the body.

In at least one embodiment, a handheld controller comprises a body with a control opening, and a control member pivotally coupled to the body in the control opening. A flexible guard is connected to the body and the control member. The guard has a tubular neck with a top region connected to the control member, and a skirt extending outwardly from a bottom region of the neck and away from a central longitudinal axis of the neck. An outer circumference of the skirt is sealably connected to an interior portion of the handheld controller around the control opening. The guard has a flexible joint portion extending around the circumference of the bottom region of the neck, wherein the joint portion connects the neck to the skirt and is configured to bend to allow the neck to move relative to the skirt upon pivoting the control member relative to the body.

In another embodiment, a handheld controller comprises a main body with a thumb surface having an opening, and a thumbstick extending through the opening. The thumbstick is configured to pivot within the opening. A flexible guard is connected to the main body around the opening. The flexible guard has a tubular neck coupled to at least a portion the thumbstick, and a skirt extending outwardly from a bottom portion of the neck away from a longitudinal axis of the neck. A periphery of the skirt is sealably positioned under the thumb surface. The guard has an annular joint between the tubular beck and the skirt. When the neck is coupled to the thumbstick and the thumbstick is moved in a direction, the neck bends about the annular joint towards the direction and the relative to the skirt.

General Description

Various examples of the devices introduced above will now be described in further detail. The following description provides specific details for a thorough understanding and enabling description of these examples. One skilled in the relevant art will understand, however, that the techniques discussed herein may be practiced without many of these details. Likewise, one skilled in the relevant art will also understand that the technology can include many other features not described in detail herein. Additionally, some well-known structures or functions may not be shown or described in detail below so as to avoid unnecessarily obscuring the relevant description.

The terminology used below is to be interpreted in its broadest reasonable manner, even though it is being used in conjunction with a detailed description of some specific examples of the embodiments. Indeed, some terms may even be emphasized below; however, any terminology intended to be interpreted in any restricted manner will be overtly and specifically defined as such in this section.

Figure 1:
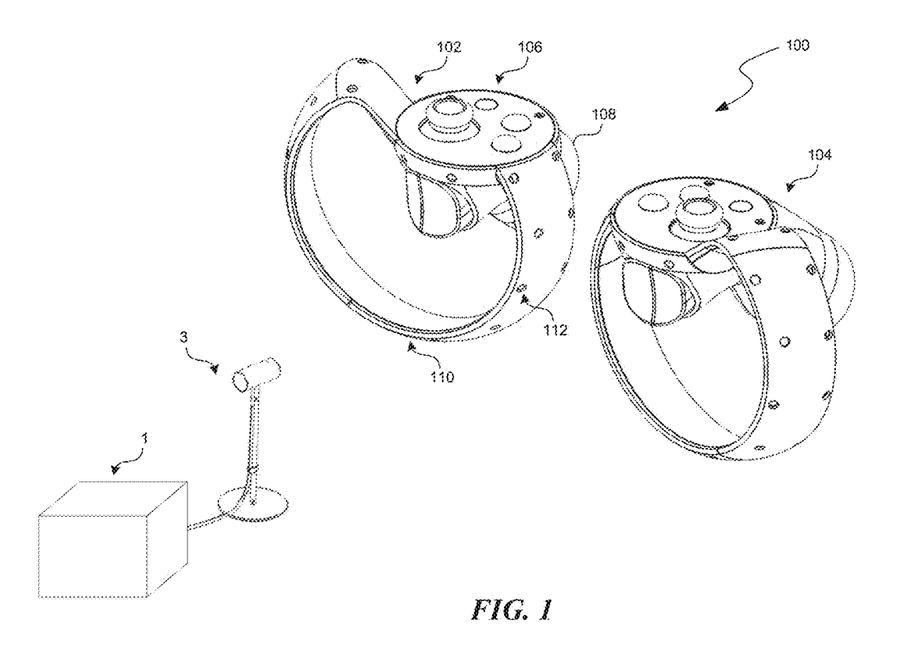
FIG. 1 is an isometric view of a pair of handheld controllers according to a representative embodiment.

FIG. 1 illustrates a pair of handheld controllers 100 according to a representative embodiment. The pair of handheld controllers 100 includes a right-hand controller 102 and a left-hand controller 104. The primary structure of the right-hand controller 102 and the left-hand controller 104 when held adjacent to each other in a similar orientation, as illustrated, are substantially symmetric with respect to each other. Both controllers 102/104 are described herein with respect to the right-hand controller 102, as both controllers include the same or similar features, albeit in mirror image. The right-hand controller 102 includes a main body 106 and a handle 108 extending from the main body 106. In some embodiments, a surrounding ring portion 110 extends from the main body 106. The controllers 102/104 can be part of a VR system 1, such as the Rift™ available from Oculus™. Each of the controllers 102/104 includes a plurality of tracking features positioned in a corresponding tracking pattern, such as the right-hand controller's tracking pattern 112. The tracking features in the tracking patterns are configured to be accurately tracked by a tracking camera 3 to determine the motion, orientation, and/or spatial position of the controller for reproduction in a virtual environment. The tracking features can include, for example, fiducial markers or light emitting diodes (LED).

Figure 2A:
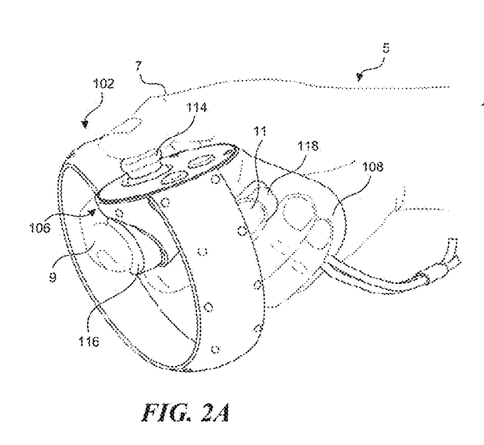
FIG. 2A is an isometric view of a user's right hand grasping the right-hand controller of FIG. 1.
Figure 2B:
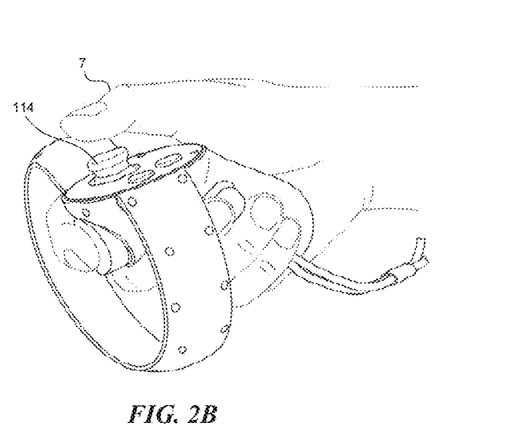
FIG. 2B is an isometric view of the right-hand controller as shown in FIG. 2A with the user's thumb in a thumbs-up position.

As shown in FIG. 2A, the handle 108 of the right-hand controller 102 is grasped by a user's right hand 5. When the controller 102 is grasped, the user's thumb 7 (i.e., the user's first finger) is positioned above the main body 106 and rests on a thumbstick 114. The user's second or index finger 9 is positioned on a trigger button 116. The user's third or middle finger 11 is positioned to contact a third finger button 118 on the handle portion 108. The controllers 102 and 104 are configured to detect a user's hand and/or finger gestures, such as a thumbs-up gesture as shown in FIG. 2B. As described more fully below, a thumbs-up gesture is indicated when the user removes his or her thumb 7 from the thumbstick 114 for a threshold period of time without touching the same or another button. Although the various embodiments are described with respect to a thumbs-up gesture, other hand and/or finger gestures can be detected with the disclosed technology. For example, a pointing gesture can be detected with the trigger button 116. A hand or finger gesture, such as an open hand, can be detected with the third finger button 118. The presence of a gesture can be a signal to the VR system to initiate a command or to include the gesture in a corresponding apparition or avatar.

Figure 3:
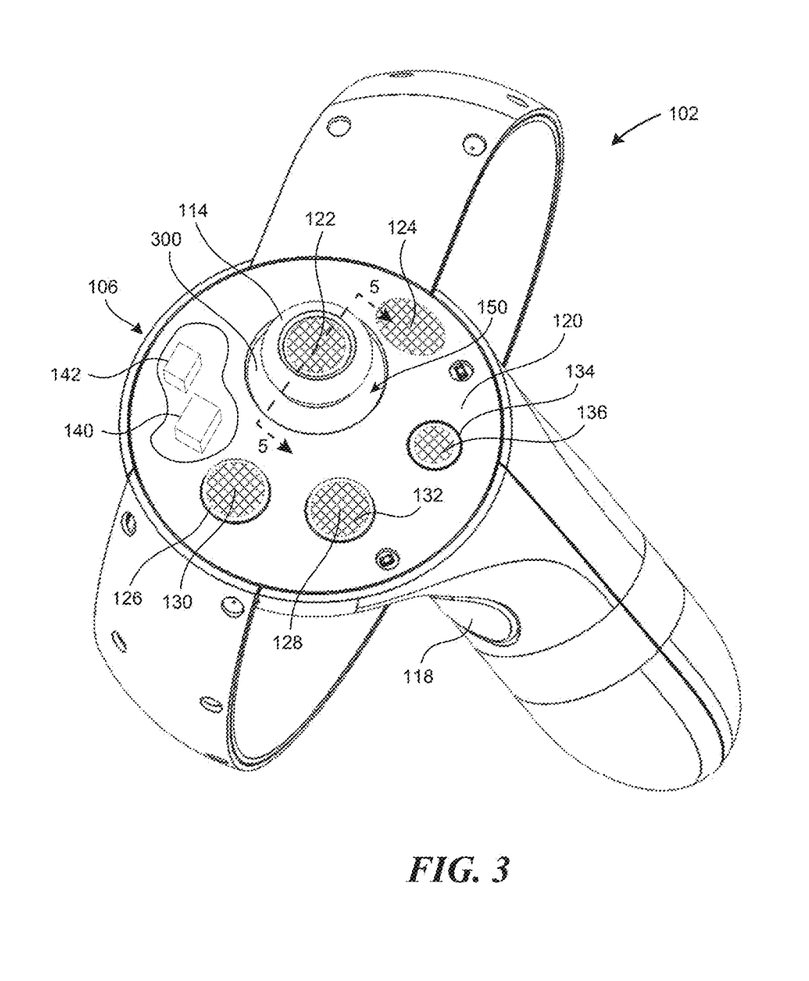
FIG. 3 is an isometric view of the right-hand controller shown in FIGS. 1-2B as viewed from the top of the controller.

With further reference to FIG. 3, the main body 106 of the right-hand controller 102 includes a thumb surface 120 having an opening 150 through which the thumbstick 114 extends, and a flexible guard 300 positioned around a bottom portion of the thumbstick 114. In the representative embodiment, the guard 300 spans the opening 150 between the thumbstick 114 and the thumb surface 120 to inhibit dirt, dust, liquid, and/or other unwanted material from moving through the opening to an interior region of the controller 102. The guard 300 is described in greater detail below with reference to FIGS. 4A-5.

As shown in FIG. 3, the thumbstick 114 can include a thumb sensor 122 to detect the presence of the user's thumb or other finger. The presence of a finger can include touching the sensor or hovering over the sensor within a selected distance. In some embodiments, the thumb sensor 122 can be a capacitive touch sensor. The thumb surface 120 can include a capacitive-touch sensor area 124 positioned next to the thumbstick 114 in order to detect when a user is resting their thumb on the thumb surface 120. In some embodiments, the entire thumb surface 120 is a capacitive touch sensor. The thumb surface 120 may include additional buttons 126, 130, and 134, each of which may include a capacitive touch sensor 128, 132, and 136, respectively. A hand gesture, such as a thumbs-up gesture, can be detected when the user lifts their thumb off of a first sensor, such as the thumb sensor 122, and does not place it on the first sensor or a second sensor, such as the sensor area 124, for a selected threshold period of time. It should be understood that a touch sensor can comprise either a capacitive touch sensor or a push button, such as one of the buttons 126, 130, and 134. In some embodiments, the trigger button 116 (see FIG. 2A) and the third finger button 118 can each include a capacitive touch sensor to facilitate finger and gesture detection according to the disclosed techniques.

In other embodiments, the controller 102 can include pressure sensors, and/or proximity sensors to detect the presence or spatial movement of the user's hands or fingers relative to the thumb surface, the controls, or the handle. Further explanation of finger and/or movement detection can be found, for example, in U.S. patent application Ser. No. 14/939,431, titled "HANDHELD CONTROLLER WITH THIRD FINGER GRIP DETECTION," filed Nov. 12, 2015, and U.S. patent application Ser. No. 14/939,470, titled "METHOD AND APPARATUS FOR DETECTING HAND GESTURES WITH A HANDHELD CONTROLLER," filed Nov. 12, 2015, and U.S. patent application Ser. No. 14/975, 049, titled "HANDHELD CONTROLLER WITH ACTIVATION SENSORS," filed Dec. 18, 2015, and U.S. patent application Ser. No. 15/172,099, titled "HANDHELD CONTROLLER WITH HAND DETECTION SENSORS," filed Jun. 2, 2016. The foregoing patent applications are hereby incorporated by reference in their entireties.

In some embodiments, the controller 102 includes an inertial measurement unit (IMU) 142 to monitor rotation and orientation of the controller. Thus, if the user makes, for example, a thumbs-up gesture and the IMU 142 determines that the user's hand has been rotated, then the registered hand gesture can be modified to represent a thumbs-down gesture, for example. In some embodiments, the controller 102 includes a processor or microcontroller 140 to perform the timing and monitoring of the buttons (114, 116, 118, 126, 130, 134), sensors (122, 124, 128, 132, 136), and IMU 142. In other embodiments, a computer included in the VR system 1 (see FIG. 1) can be used to monitor the buttons, sensors, and IMU 142 and to determine the hand gesture indicated by the sensors and buttons. In some embodiments, the rotation and orientation of the handheld controller is determined by the IMU 142 and/or by monitoring the tracking pattern 112 with the tracking camera 3 (see FIG. 1).

Figure 4A:
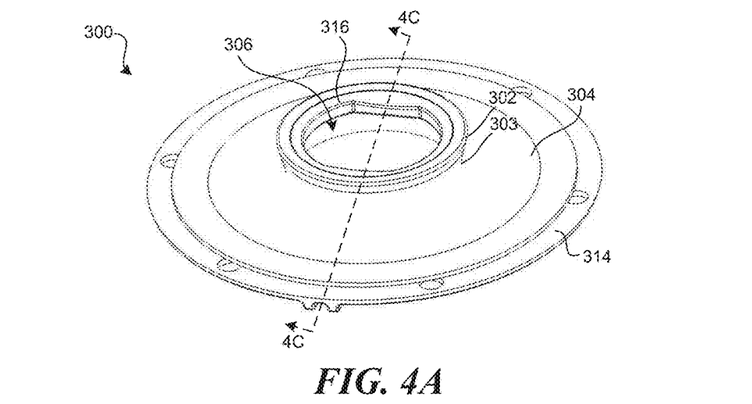
FIG. 4A is an isolated, isometric view of the thumbstick guard shown in FIG. 3 as viewed from the top of the guard.
Figure 4B:
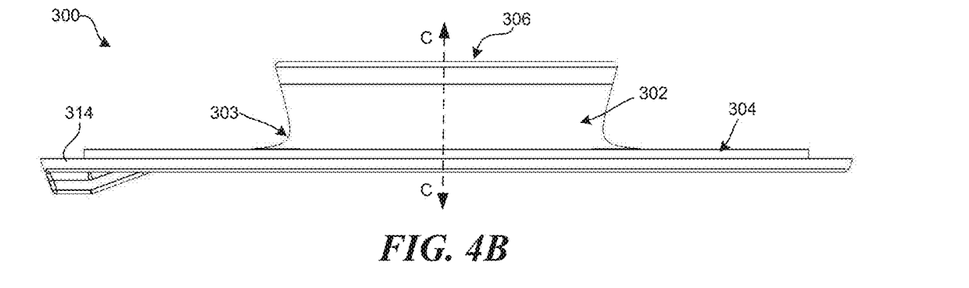
FIG. 4B is an isolated, side view of the thumbstick guard shown in FIG. 3.

FIG. 4A is an isometric view of the guard 300 shown in FIG. 3 isolated from the rest of the right-hand controller 102 and as viewed from the top of the guard 300. FIG. 4B is a side view of the guard 300, and FIG. 4C is a cross-sectional view of the guard 300 taken along line 4C-4C in FIG. 4A.

Figure 4C:
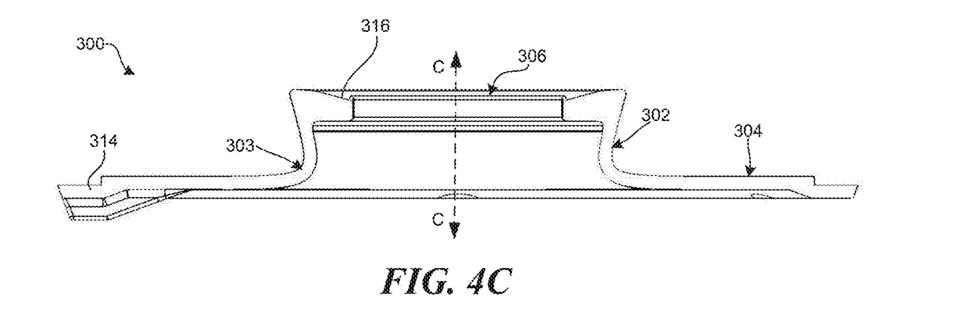
FIG. 4C is an isolated, cross-sectional view of the thumbstick guard shown in FIG. 3, taken along line 4C-4C in FIG. 4A.

Referring to FIGS. 4A-4C together, the guard 300 includes a tubular neck 302 having a central longitudinal axis C (FIGS. 4B-4C), an annular joint portion 303 at the base or bottom portion of the neck 302, and a skirt 304 coupled to the neck 302 at the joint portion 303. The skirt 304 extends outwardly from the neck 302 away from its central longitudinal axis C. In the illustrated embodiment, the guard 300 comprises a single component such that the neck 302 is integral with the skirt 304. In other embodiments, the neck 302 and the skirt 304 are separate, interconnected components. As described in greater detail below with reference to FIG. 5, the neck 302 is configured to be coupled to a bottom portion of the thumbstick 114 (FIG. 3) while at least an outer circumference of the skirt 304 is sealably attached or otherwise securely positioned under the portion of the thumb surface 120 (FIG. 3) defining the opening 150 (FIG. 3). As such, the guard 300 spans the opening 150 (FIG. 3) between the thumbstick 114 and the thumb surface 120, thereby inhibiting the movement of unwanted material (e.g., dust, dirt, liquid, etc.) through the opening 150 and into an interior region of the controller 102 (FIG. 3).

As shown in FIGS. 4A-4C, the neck 302 includes a generally tubular sidewall that extends upwardly from the annular joint portion 303 and defines a lumen 306 therethrough. The lumen 306 is configured to receive a portion of the thumbstick 114 (FIG. 3). A top portion of the neck 302 includes an annular flange 316 (not visible in FIG. 4B) extending into the lumen 306 from an inner surface of the sidewall. In some embodiments, the flange 316 is configured to engage an annular recess along an outer surface of the thumbstick 114, thereby coupling a top portion of the guard 300 and/or neck 302 to the thumbstick 114. In other embodiments, the thumbstick 114 and/or guard 300 can include other suitable coupling means. For example, in some embodiments, the neck 302 includes an annular recess along its outer surface configured to receive an annular flange of the thumbstick 114 and/or the neck 302 is configured to be positioned within a lumen of the thumbstick 114.

In the embodiment shown in FIGS. 4A-4C, the skirt 304 has a circular shape (as viewed from above) and extends away from the joint portion 303 and/or the base of the neck 302 within a plane generally perpendicular to the central longitudinal axis C of the neck 302 (FIGS. 4B-4C). In some embodiments, the skirt 304 has a stepped portion 314 around its circumference configured to receive a wear ring 400, as discussed in greater detail below with reference to FIG. 5. In other embodiments, the skirt 304 can have other suitable configurations depending on the shape, size, and/or configuration of the thumbstick 114 (FIG. 3), thumb surface 120 (FIG. 3), and/or opening 150 (FIG. 3) in the thumb surface 120 (FIG. 3). For example, in some embodiments, the skirt 304 can curve downwardly or upwardly as it extends away from the neck 302. Additionally, in some embodiments the skirt 304 remains generally flat across its width and does not include a stepped portion.

Figure 5:
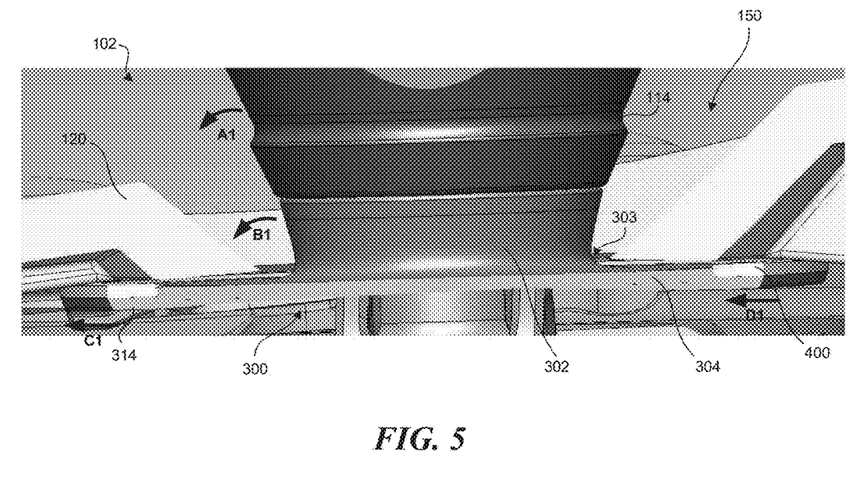
FIG. 5 is an enlarged, cross-sectional side view of a portion of the right-hand controller shown in FIG. 3, taken along line 5-5.

In the representative embodiment, the neck 302 and/or skirt 304 are formed of a flexible, elastomeric material (e.g., silicone rubber) such that (1) the neck 302 and/or skirt 304 can bend relative to one another, and (2) the guard 300 can bend or flex relative to the thumbstick 114. For example, FIG. 5 is an enlarged, cross-sectional side view of a portion of the right-hand controller 102 taken along line 5-5 in FIG. 3. As shown in FIG. 5, when the right-hand controller 102 is assembled, the neck 302 of the guard 300 surrounds and contacts a bottom portion of the thumbstick 114 while an outer circumference of the skirt 304 is sealably positioned under a portion of the thumb surface 120 (i.e., the thumb surface 120 overlaps the skirt 304 around the entire circumference of the skirt 304). When a user pivots or rotates the thumbstick 114 within or around the opening 150 (for example, in the direction of arrow A1), the thumbstick 114 pulls on the neck 302 and causes the neck 302 to bend or flex about the annular joint portion 303 (for example, as indicated by arrow B1) in the direction of the movement of the thumbstick 114.

Depending on the extent the user pivots the thumbstick 114 and the corresponding forces exerted on the neck 302, bending or flexing of the neck 302 can push the near side of the skirt 304 in the direction of the movement of the thumbstick 114 (indicated by arrow C1) and pull the far side of the skirt 304 in the same direction (indicated by arrow D1). As such, bending or flexing the neck 302 about the annular joint portion 303 can shift or translate the entire skirt 304 in the direction of the movement of the thumbstick 114. Although the skirt 304 is made of a flexible material, the skirt 304 can be sufficiently rigid such that the bending or flexing of the neck 302 does not affect the generally linear profile of the skirt 304. In other words, when the neck 302 bends or flexes and the skirt 304 slides relative to the thumb surface 120, a portion of the top surface of the skirt 304 remains in contact with or in close proximity to an underside of the thumb surface 120. Such a configuration reduces the likelihood of unwanted material getting through the opening 150 and into the interior of the controller 102 (FIG. 3) when the user pivots or rotates the thumbstick 114. As previously mentioned, in some embodiments the controller 102 can include a wear ring 400 positioned around the circumference of the skirt 304 and configured to absorb the contact forces between the an inner surface of the thumb surface 120 and a top portion of the skirt 304.

REMARKS

The techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to program a computer, a microprocessor, processor, and/or microcontroller (or other electronic devices) to perform a process. The machine-readable medium may include, but is not limited to, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. For example, although the guard 300 is described above with reference to the thumbstick 114, the guard 300 can be used with any button and/or control stick. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

What is claimed is:

1. A handheld controller, comprising:
   a body with a control opening;
   a control member pivotally coupled to the body, the control member comprising a shaft portion extending through the control opening and an upper surface positioned to confront a finger of a user's hand; and
   a guard connected to the body and the control member, the guard comprising:
      a tubular neck with a top region connected to the shaft portion of the control member and having a bottom region, the shaft portion of the control member extending through the neck;
      a skirt extending outwardly from a bottom region of the neck and away from a central longitudinal axis of the neck, wherein an outer circumference of the skirt is sealably connected to an interior portion of the body of the handheld controller around the control opening; and
      a flexible joint portion extending around the circumference of the bottom region of the neck, wherein the joint connects the neck to the skirt and is configured to bend to allow the neck to move relative to the skirt upon pivoting the control member relative to the body.

2. The handheld controller of claim 1 wherein:
   the neck includes a tubular sidewall defining a lumen therethrough and a flange extending into the lumen from an inner surface of the sidewall; and
   the shaft portion of the control member is positioned to extend through the lumen.

3. The handheld controller of claim 1 wherein the flange is configured to be received by an annular recess in the shaft portion of the control member.

4. The handheld controller of claim 1 wherein the skirt extends away from the neck within a plane generally perpendicular to the central longitudinal axis.

5. The handheld controller of claim 1 wherein the skirt includes a stepped portion around its circumference configured to receive a wear ring.

6. The handheld controller of claim 1 wherein:
   the neck includes a tubular sidewall defining a lumen therethrough and a flange extending into the lumen from an inner surface of the sidewall;
   the shaft portion of the control member is positioned to extend through the lumen; and
   the skirt extends away from the neck within a plane generally perpendicular to the central longitudinal axis.

7. The handheld controller of claim 1 wherein:
   the neck is made of an elastomeric material and includes a tubular sidewall defining a lumen therethrough and a flange extending into the lumen from an inner surface of the sidewall;
   the shaft portion of the control member is positioned to extend through the lumen; and
   the skirt extends away from the neck within a plane generally perpendicular to the central longitudinal axis.

8. The handheld controller of claim 1 wherein:
   the neck includes a tubular sidewall defining a lumen therethrough and a flange extending into the lumen from an inner surface of the sidewall;
   the shaft portion of the control member is positioned to extend through the lumen; and
   the skirt extends away from the neck within a plane generally perpendicular to the central longitudinal axis and includes a stepped portion around its circumference configured to receive a wear ring.

9. The handheld controller of claim 1 wherein the neck is integral with the skirt.

10. The handheld controller of claim 1 wherein the neck and the skirt are made of an elastomeric material.

11. A handheld controller, comprising:
    a main body including a thumb surface having an opening;
    a thumbstick comprising a shaft portion extending through the opening and an additional thumb surface positioned to confront a finger of a user's hand, wherein the thumbstick is configured to pivot within the opening; and
    a flexible guard having—
       a tubular neck coupled to at least the shaft portion of the thumbstick, the shaft portion of the thumbstick extending through the neck;
       a skirt extending outwardly from a bottom portion of the neck away from a longitudinal axis of the neck, wherein a periphery of the skirt is sealably connected under the thumb surface of the main body;
       an annular joint between the tubular neck and the skirt; and
    wherein, when the neck is coupled to the shaft portion of the thumbstick and the thumbstick is moved in a direction, the neck bends about the annular joint towards the direction and the neck moves relative to the portion of the skirt under the thumb surface.

12. The handheld controller of claim 11, further including a sensor disposed on the additional thumb surface of the thumbstick.

13. The handheld controller of claim 12 wherein the sensor is a first sensor and wherein the handheld controller further includes a second sensor disposed on the thumb surface.

14. The handheld controller of claim 13 wherein the first sensor and the second sensor are capacitive sensors.

15. The handheld controller of claim 11 wherein the guard is made of an elastomeric material.

16. The handheld controller of claim 11 further comprising a processor housed in the main body.

17. The handheld controller of claim 11 further comprising a handle extending from the main body.

18. The handheld controller of claim 11 wherein the skirt extends away from the neck within a plane generally perpendicular to the longitudinal axis.

19. The handheld controller of claim 11 wherein:
the neck includes a tubular sidewall defining a lumen therethrough and a flange extending into the lumen from an inner surface of the sidewall; and
the shaft portion of the thumbstick is positioned to extend through the lumen.

20. The handheld controller of claim 11 wherein the skirt includes a stepped portion around its circumference configured to receive a wear ring.

\* \* \* \* \*